(12) United States Patent
Nakamura (10) Patent No.: US 6,831,793 B2
(45) Date of Patent: Dec. 14, 2004

(54) OPTICAL APPARATUS AND IMAGE-PICKUP APPARATUS

(75) Inventor: Hidekazu Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/619,505

(22) Filed: Jul. 16, 2003

(65) Prior Publication Data
US 2004/0022532 A1 Feb. 5, 2004

(30) Foreign Application Priority Data
Jul. 22, 2002 (JP) ........................................ 2002-213015

(51) Int. Cl.⁷ .......................... G02B 15/14; G02B 17/00
(52) U.S. Cl. .......................... 359/697; 396/86; 396/131; 396/135
(58) Field of Search ............................ 359/696–698, 359/823, 824; 396/85–87, 131, 135, 136

(56) References Cited
U.S. PATENT DOCUMENTS
5,832,318 A * 11/1998 Sato et al. .................... 396/86

2002/0001138 A1 * 1/2002 Fukita et al. ................ 359/696
2002/0057503 A1 * 5/2002 Imaoka et al. .............. 359/697

* cited by examiner

Primary Examiner—Georgia Epps
Assistant Examiner—M. Hasan
(74) Attorney, Agent, or Firm—Fitzpatrick, Cella, Harper & Scinto (57) ABSTRACT

An optical apparatus capable of reducing processing burden on the controller and achieving high-speed driving and improvement of the resolution of stop positions of an optical element. The optical apparatus includes a drive unit that drives the optical element, an operation member manually operated to instruct driving of the optical element and a signal output unit that outputs a signal that varies periodically according to the operation of the operation member. The controller determines the operation speed of the operation member based on the signal from the signal output unit, and chooses whether to control the drive unit according to the operation speed based on a count of periodic variations of the signal from the signal output unit, or to control the drive unit based on a value of the signal from the signal output unit.

6 Claims, 8 Drawing Sheets

OPTICAL APPARATUS AND IMAGE-PICKUP APPARATUS

BACKGROUND OF THE INVENTION

1. Field of the Invention

The present invention relates to an optical apparatus that detects an operation of an operation member using a magneto-resistive (MR) element and optical sensor, etc., and controls the driving of an optical element, and to an image-pickup apparatus using this optical apparatus.

2. Description of the Related Art

A lens apparatus (optical apparatus) used for an image-pickup apparatus such as a video camera or digital still camera may be provided with a manual operation ring that gives drive instructions to a drive unit of a variable-power optical element or focusing optical element. In this case, a controller detects an amount of operation or operation direction of the manual operation ring and controls a driving operation of the drive unit, that is, the optical element, according to the detection result.

As an example of a drive control system for optical elements using such a manual operation ring, there is a system constructed of a magnetic scale made up of different magnetic poles, which are arranged with alternating magnetic polarities, and a magnetic sensor facing this magnetic scale in such a way as to move relative to each other in accordance with operation of the manual operation ring, and to control a drive unit based on a count (count value) of a periodic variation (pulse) of a signal output from the magnetic sensor.

Figure 7:
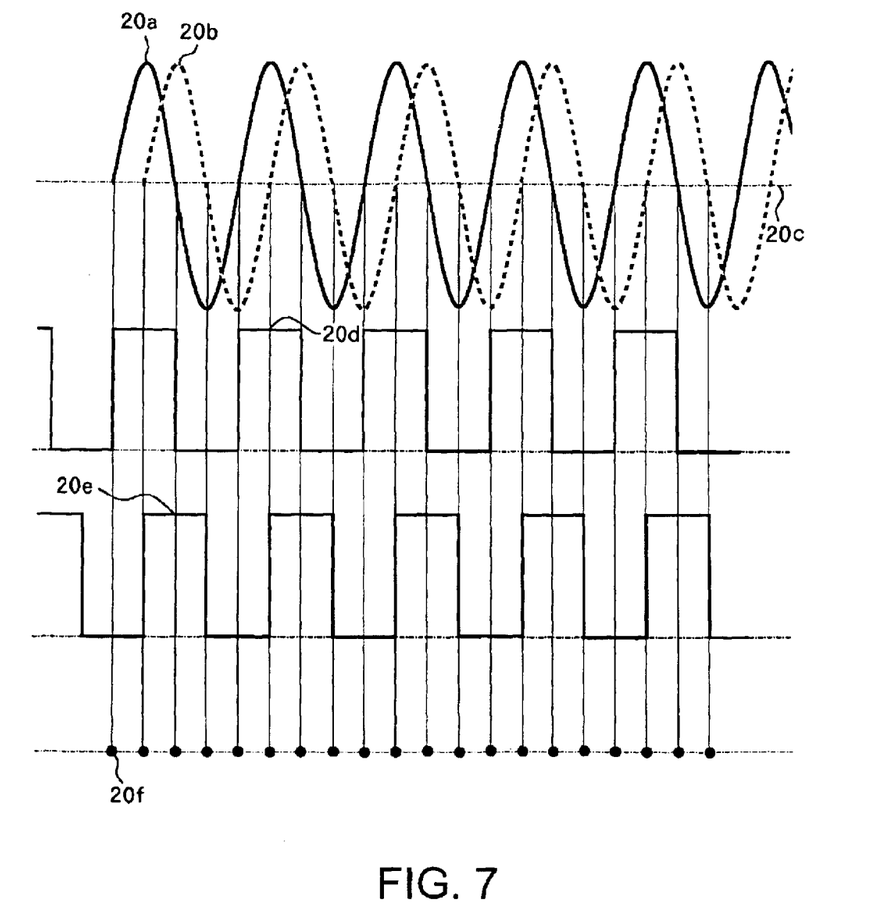
FIG. 7 illustrates an output signal of an MR sensor and pulse conversion.

FIG. 7 shows an example of a control system utilizing a pulse count of a magnetic (MR) sensor. Reference numerals 20a and 20b in the figure denote output signals of phase A and phase B from the MR sensor, as it moves relative to a magnetic scale, and 20c denotes a reference potential of the controller.

The controller converts the output signals 20a and 20b, output from the MR sensor in accordance with operation of the manual operation ring, to digital (pulse) signals such as 20d (phase A) and 20e (phase B), counts cross points 20f at which the pulse signals 20d and 20e cross the reference potential 20c, and controls the drive unit based on the count value.

Figure 8:
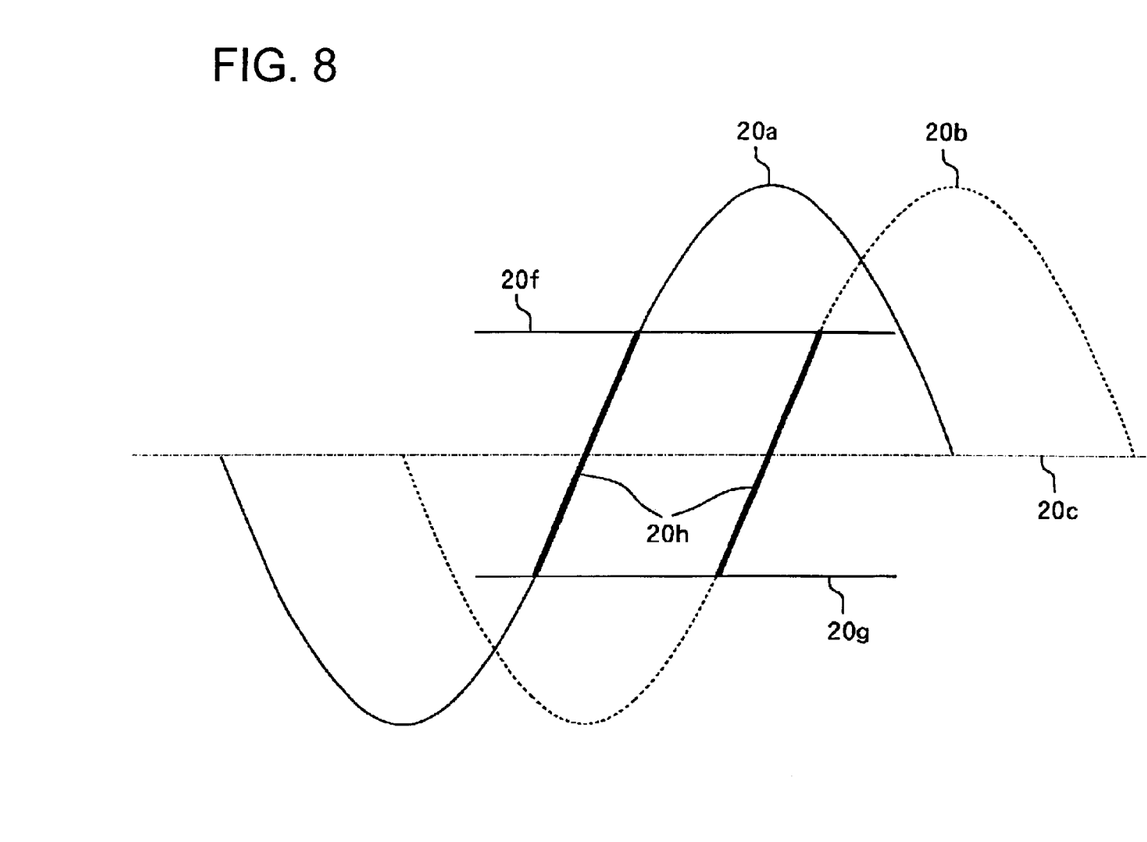
FIG. 8 illustrates intermediate division processing of the output signal of the MR sensor.

FIG. 8 illustrates an example of a control system that divides the output signal of the MR sensor at intermediate positions arbitrarily (intermediate separation control system). Reference numerals 20a and 20b denote output signals of phase A and phase B from the MR sensor as it moves relative to the magnetic scale, and 20c denotes a reference potential of the controller.

The controller extracts a portion 20h of good linearity (20f is an upper threshold of the linear portion 20h, and 20g is a lower threshold of the linear portion 20h) of the output signals 20a and 20b from the MR sensor, and divides this linear portion 20h by an arbitrary number, for example, 20 or 50. Then, the controller controls the drive unit based on the signal value obtained during operation of the manual operation ring.

In order to improve resolution of the stop position of a variable-power optical system or a focusing optical system, it is necessary to improve detection resolution of the rotation position of the manual operation ring. Here, according to a pulse count control system using the MR sensor, the resolution of the rotation position of the manual operation ring is determined by the pitch of a detection magnet of the MR sensor. For this reason, improving the resolution of the rotation position requires the magnet pitch to be reduced.

However, there is a limit to work (manufacture) for reducing the magnet pitch and it is difficult to further reduce the actual pitch. Thus, it is difficult to drastically improve the resolution of the rotation position of the manual operation ring. It is also possible to consider a method that provides several stages of gear between the manual operation ring and the magnetic scale to mechanically improve the resolution, but this would lead to an increase in size of the apparatus.

On the other hand, the control system realized through intermediate division of the output signal of the MR sensor improves the resolution but complicates the processing of the control circuit and slows down the processing speed. Moreover, the user rotates the manual operation ring at high speed mostly for the purpose of moving optical elements close to a desired position at high speed without questioning segmentation of the resolution of stop positions of the optical element.

SUMMARY OF THE INVENTION

It is an object of the present invention to provide an optical apparatus, and an image-pickup apparatus provided with this optical apparatus, capable of reducing the processing burden on a controller, driving the optical element at high speed and improving the resolution of stop positions.

In order to attain the above-described object, the optical apparatus, which is one aspect of the present invention, includes a movable optical element, a drive unit that drives the optical element, an operation member manually operated to instruct a driving operation of the optical element, a signal output unit that outputs a signal that varies periodically according to operation of the operation member, and a controller that controls the drive unit based on a signal from the signal output unit. The controller determines the operation speed of the operation member based on the signal from the signal output unit, and determines whether to control the drive unit based on a count of periodical variations of the signal from the signal output unit or to control the drive unit based on the value of the signal from the signal output unit.

Furthermore, an image-pickup apparatus of the present invention includes the optical apparatus constructed as described above and a photoelectric conversion element that photoelectrically converts the image of an object formed by the optical apparatus.

The features of the optical apparatus and image-pickup apparatus of the present invention will become more apparent with reference to the following detailed description of preferred embodiments of the present invention taken in conjunction with the accompanying drawings.

DETAILED DESCRIPTION OF THE PREFERRED EMBODIMENTS

With reference now to the attached drawings, embodiments of the present invention will be explained below.

(Embodiment I)

Figure 1:
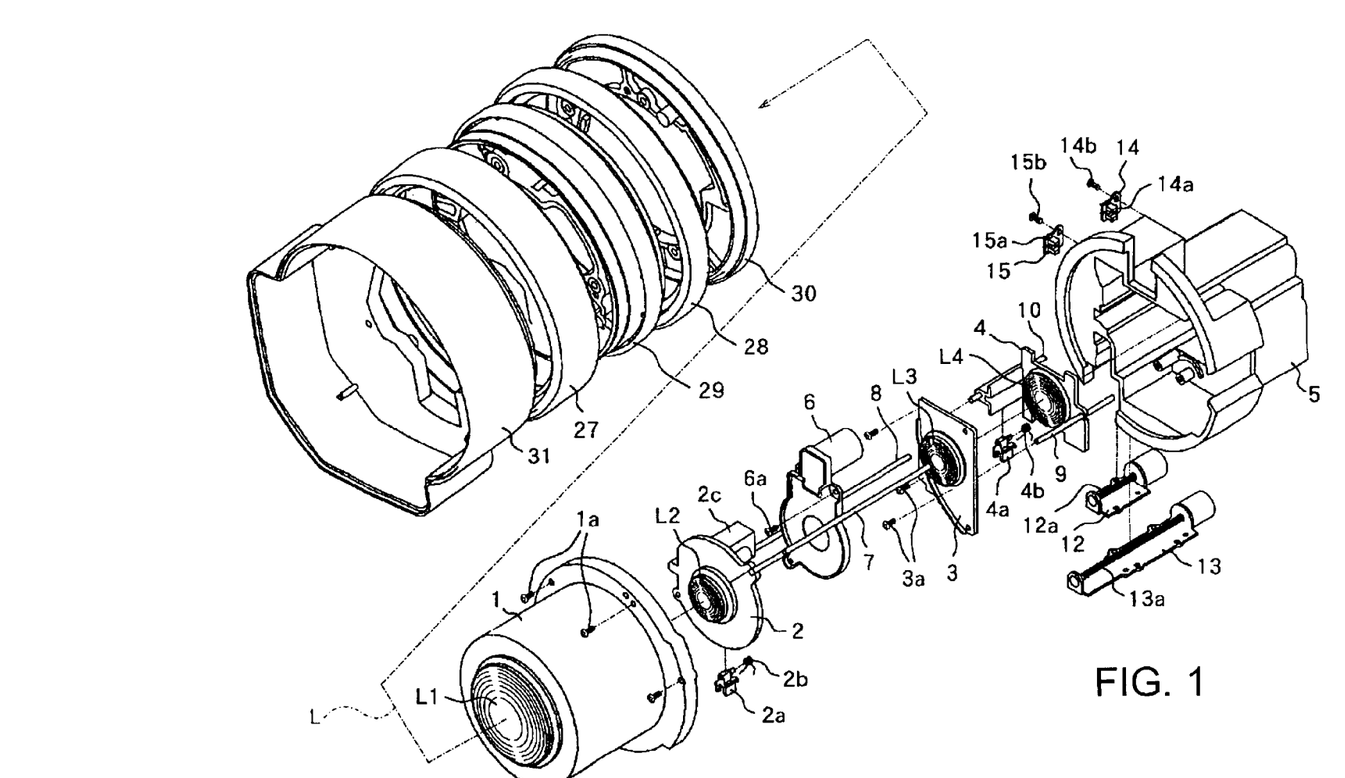
FIG. 1 is an exploded perspective view of a lens apparatus, which is an embodiment of the present invention.

FIG. 1 shows a lens apparatus (optical apparatus), which is an embodiment of the present invention. As shown in FIG. 1, this lens apparatus has four lens units having convex, concave, convex and convex optical power in that order from an object side to an image plane side and constitutes an image-taking lens section of an image-pickup apparatus, such as a video camera or a digital still camera.

In FIG. 1, reference numeral L1 denotes a fixed first lens unit, L2 denotes a second lens unit that performs variable-power operation by moving in the direction of the optical axis L of the lens apparatus, L3 denotes a fixed third lens unit and L4 denotes a fourth lens unit that performs focus adjustment operation (or image plane transfer correction operation accompanying power variation) by moving in the direction of the optical axis L.

Reference numeral 1 denotes a fixed lens barrel that holds the first lens unit L1, 2 denotes a second lens unit holding member that holds the second lens unit L2, 3 denotes a third lens unit holding member that holds the third lens unit L3, 4 denotes a fourth lens unit holding member that holds the fourth lens unit L4, and 5 denotes a rear lens barrel that holds an image-pickup element (indicated by reference numeral 45 in FIG. 4), which is a photoelectric conversion element such as CCD or CMOS sensor.

The fixed lens barrel 1 and rear lens barrel 5 align and fix two guide bars 7 and 8. The lens unit holding member 2 is supported by the guide bars 7 and 8 in a manner movable in the direction of the optical axis L.

The third lens unit holding member 3 and rear lens barrel 5 align and fix two guide bars 9 and 10. The fourth lens unit holding member 4 is supported by the guide bars 9 and 10 in a manner movable in the direction of the optical axis L. Furthermore, the third lens unit holding member 3 is aligned with and fixed to the rear lens barrel 5 via screws 3a.

Reference numeral 6 denotes a diaphragm unit that changes the aperture of the image-taking optical system; in this embodiment, the diaphragm unit 6 is a so-called iris type diaphragm that changes the aperture by opening/closing six diaphragm blades. This diaphragm unit 6 is fixed to the rear lens barrel 5 via screws 6a.

The fixed lens barrel 1 is aligned with the rear lens barrel 5 and fixed to the rear lens barrel 5 via screws 1a.

Reference numeral 12 denotes a stepping motor unit (focus drive unit) that drives the fourth lens unit holding member 4 in the direction of the optical axis L, and has a lead screw 12a integrally formed with its output axle. The lead screw 12a is engaged with a rack 4a mounted on the fourth lens unit holding member 4. Thus, when the stepping motor unit 12 rotates, the fourth lens unit holding member 4 is driven in the direction of the optical axis L, guided by the guide bars 9 and 10, by means of engagement action between the lead screw 12a and rack 4a.

Furthermore, the fourth lens unit holding member 4, guide bar 10, rack 4a and lead screw 12a are pressed against one another by a spring force of a torsion coil spring 4b, so as to eliminate backlash therebetween.

Reference numeral 13 denotes a stepping motor unit (variable-power drive unit) that drives the second lens unit holding member 2 in the direction of the optical axis L, and has a lead screw 13a integrally formed with its output axle. The lead screw 13a is engaged with a rack 2a attached to the second lens unit holding member 2. Thus, when the stepping motor unit 13 rotates, the second lens unit holding member 2 is driven in the direction of the optical axis L, guided by the guide bars 7 and 8, by means of engagement action between the lead screw 13a and rack 2a.

Furthermore, the second lens unit holding member 2, guide bar 8, rack 2a and lead screw 13a are pressed against one another by a spring force of a torsion coil spring 2b, so as to eliminate backlash therebetween.

These stepping motor units 12 and 13 are fixed to the rear lens barrel 5 via screws (not shown).

Reference numeral 14 denotes a focus reset switch made up of a photo-interrupter. The fourth lens unit holding member 4 that moves in the direction of the optical axis L is provided with a plate-shaped light shielding section (not shown), and the focus reset switch 14 switches between a light-shielded state and a light transmitting state caused by the light shielding section going in and out between the light-emitting section and light-receiving section of the focus reset switch 14. The focus reset switch 14 outputs an electric signal in accordance with these states. This allows the controller, which will be described later, to detect whether the fourth lens unit L4 is located at a reference position or not. The focus reset switch 14 is fixed to the rear lens barrel 5 via screws 14b through the substrate 14a.

Reference numeral 15 denotes a zoom reset switch made up of a photo-interrupter. The second lens unit holding member 2 that moves in the direction of the optical axis L is provided with a plate-shaped light shielding section 2c, and the zoom reset switch 15 switches between a light-shielded state and a light transmitting state caused by the light shielding section 2c going in and out between the light-emitting section and light-receiving section of the zoom reset switch 15. The zoom reset switch 15 outputs an electric signal in accordance with these states. This allows the controller, which will be described later, to detect whether the second lens unit L2 is located at a reference position or not.

The zoom reset switch 15 is fixed to the rear lens barrel 5 via screws 15b through the substrate 15a.

Reference numerals 27 and 28 denote a manual focus ring and a manual zoom ring (both are operation members), respectively. The manual focus ring 27 is disposed on the outer circumference of the intermediate lens barrel 29 and front holding member 31. The manual zoom ring 28 is disposed on the outer circumference of the intermediate lens barrel 29 and rear holding member 30.

Figure 2:
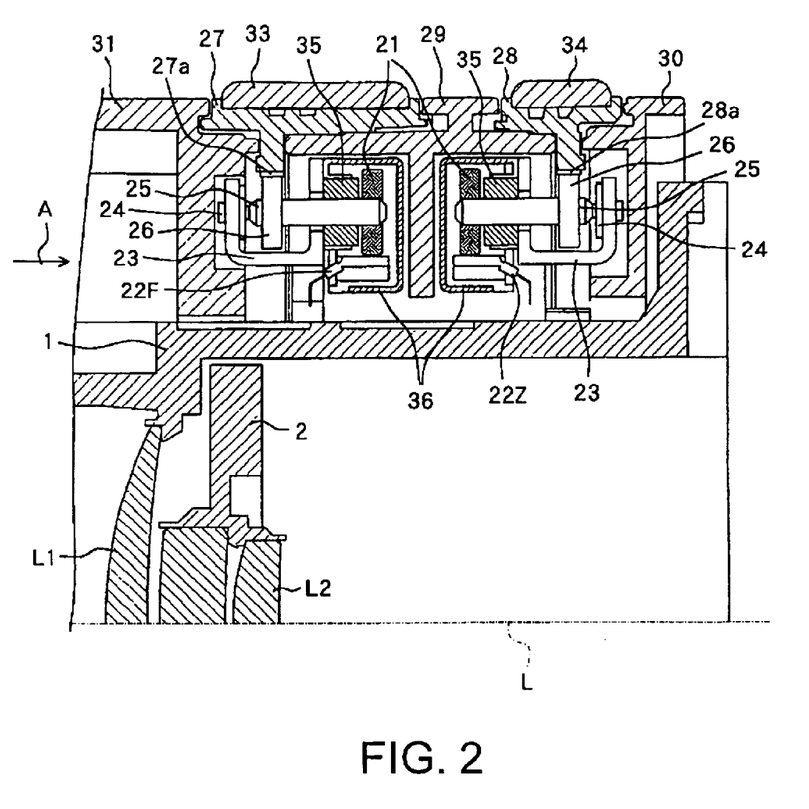
FIG. 2 is a sectional view of the periphery of an MR unit of the lens apparatus shown in FIG. 1.
Figure 3:
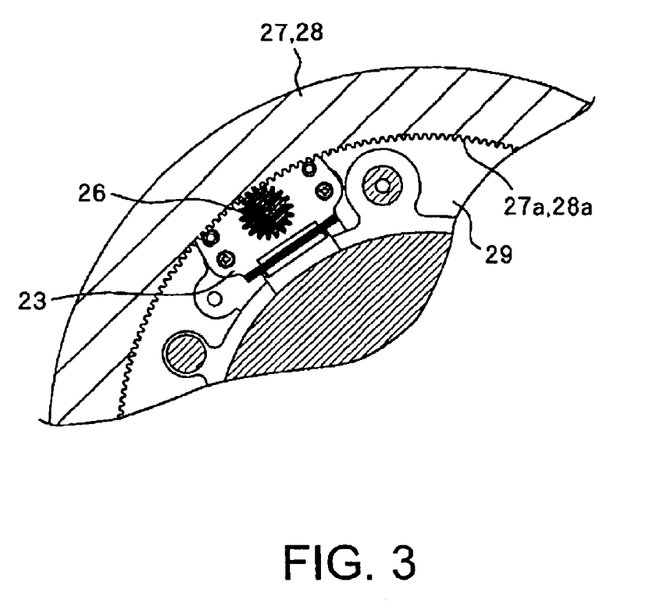
FIG. 3 is a front sectional view of the periphery of the MR unit of the lens apparatus shown in FIG. 1.

FIG. 2 and FIG. 3 show a configuration of the MR unit (signal output unit) used to detect an amount of operation and operation direction of the manual focus ring 27 and manual zoom ring 28 in this embodiment. FIG. 2 shows a side sectional view of the periphery of the MR unit, and FIG. 3 shows a front sectional view of the periphery of the MR unit viewed from the direction indicated by an arrow A in FIG. 2.

In FIGS. 2 and 3, the manual focus ring 27 is disposed on the outer circumference of the intermediate lens barrel 29 and front holding member 31, and is sandwiched between the intermediate lens barrel 29 and front holding lens barrel 31 with a minimum necessary clearance for rotation, such that the manual focus ring 27 is prevented from any excessive movement in the direction of the optical axis L.

Likewise, the manual zoom ring 28 is disposed on the outer circumference of the intermediate lens barrel 29 and rear holding member 30, and is sandwiched between the intermediate lens barrel 29 and rear holding lens barrel 30 with a minimum necessary clearance for rotation, such that the manual zoom ring 28 is prevented from any excessive movement in the direction of the optical axis.

Reference numeral 33 denotes a rubber ring to prevent a user's hand, which manually operates the manual focus ring 27, from slipping, and 34 denotes a rubber ring to prevent the user's hand, which manually operates the manual zoom ring 28, from slipping.

The MR units for the manual focus ring 27 and manual zoom ring 28 have the same structure as one another.

The MR unit is constructed of a disk-shaped magnetic scale 21 and MR sensors (MR sensor 22F for the manual focus ring 27 and MR sensor 22Z for the manual zoom ring 28) placed facing each other with a predetermined space between the two on a portion of the outer circumference of this magnetic scale 21. In the center of the magnetic scale 21, an axial member 25 is placed by means of press fitting or bonding in such a way as to be rotatable together with the magnetic scale 21. The axial member 25 is supported by a front bearing 24 and rear bearing 35 provided for a transverse U-shaped casing member 23 in a rotatable manner. The casing member 23 is fixed to the intermediate lens barrel 29. Furthermore, a gear member 26 is attached to the axial member 25 by means of press fitting or bonding in such a way as to be rotatable together with the axial member 25.

Internal tooth gear sections 27a and 28a are formed at the inner circumferences of the manual focus ring 27 and manual zoom ring 28, and gear members 26 are engaged with these internal tooth gear sections 27a and 28a. Thus, when the manual focus ring 27 or manual zoom ring 28 rotates, the gear member 26 of the respective MR unit on the rotating side rotates, the rotation is transmitted to the magnetic scale 21 through the axial member 25, and the magnetic scale 21 rotates.

This causes the magnetic scale 21 to rotate and move with respect to the MR sensor (the magnetic scale 21 moves relative to the MR sensor) and the MR sensor outputs electric signals (20a, 20b) with phase A and phase B, as shown in FIG. 7.

Figure 4:
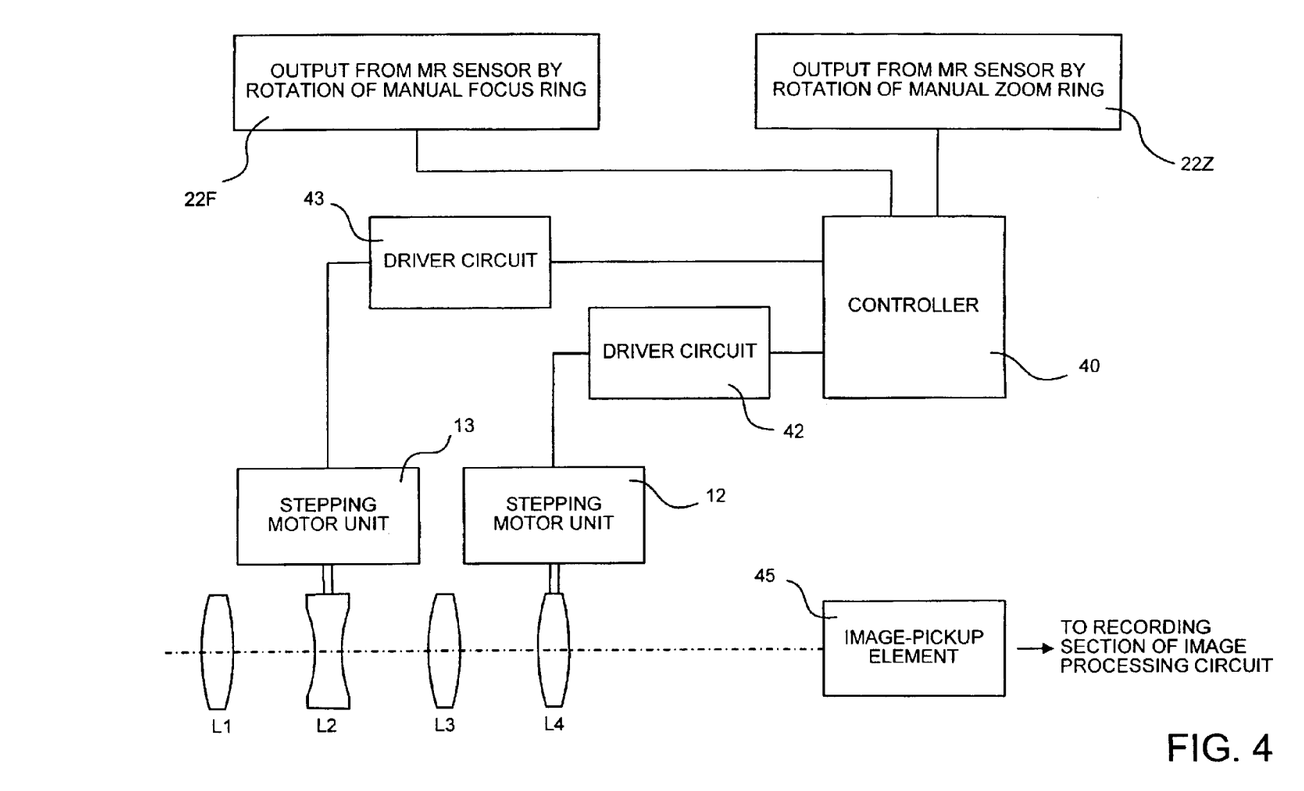
FIG. 4 is a block diagram of an electric circuit of an image-pickup apparatus provided with the lens apparatus shown in FIG. 1.

FIG. 4 shows a structure of an electric circuit of an image-pickup apparatus provided with the lens apparatus of this embodiment.

Reference numeral 40 denotes a controller made up of a CPU or MPU, etc., and controls the overall image-pickup apparatus including the above-described image-taking lens section (lens apparatus). Furthermore, the controller 40 captures signals output from the MR sensors 22F and 22Z and performs operation processing on the output signals. Reference numeral 45 denotes the aforementioned image-pickup element, which photoelectrically converts optical images of an object formed by the lens units L1 to L4. The output signal from the image-pickup element 45 is sent to an image processing circuit (not shown), subjected to various processing, transformed into image information, and then recorded in a recording medium, such as a semiconductor memory, optical disk or tape, by a recording section (not shown). Reference numerals 42 and 43 denote driver circuits that drive the stepping motor units 12 and 13 in accordance with drive signals from the controller 40.

Figure 5:
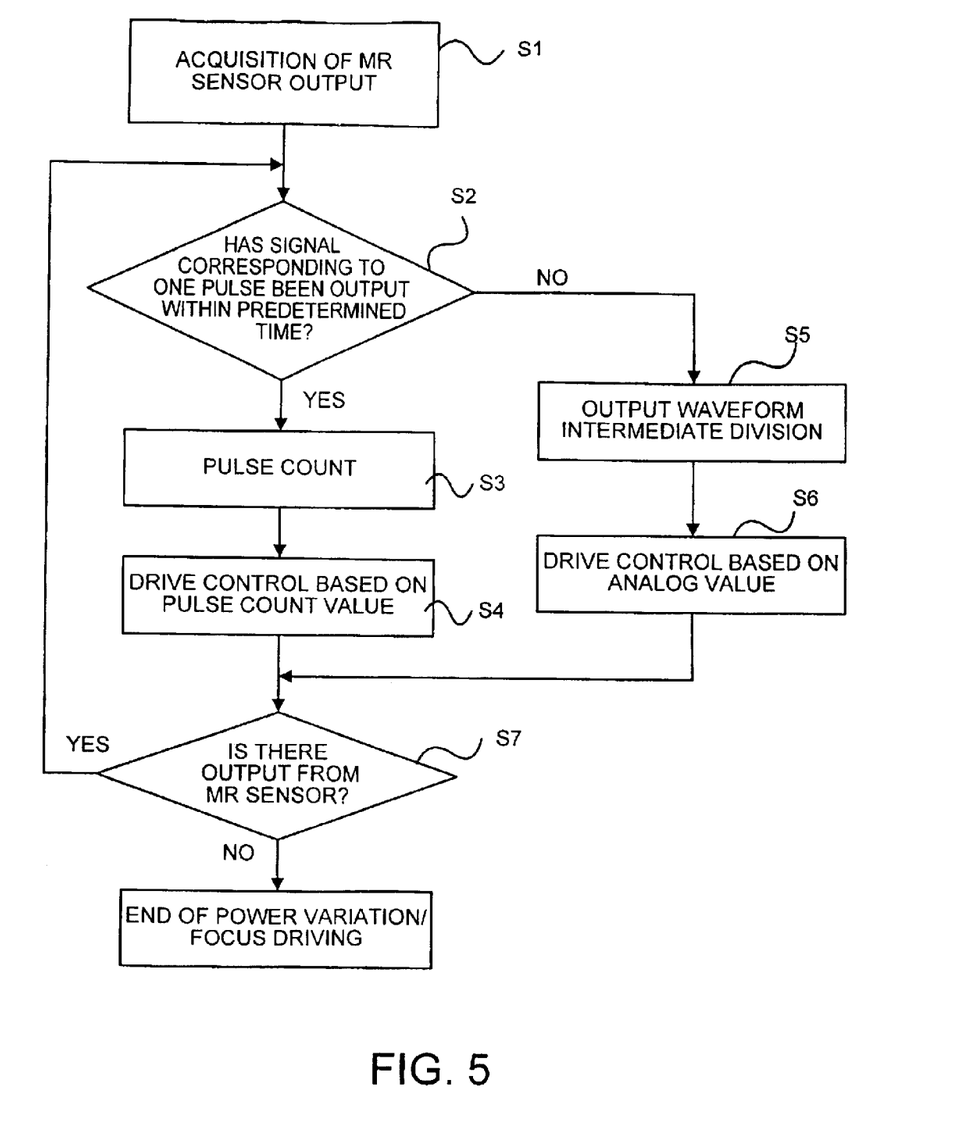
FIG. 5 is a flow chart showing a processing operation of the CPU of the image-pickup apparatus provided with the lens apparatus shown in FIG. 1.

Here, the processing operation based on the output signal from the MR sensors 22F and 22Z at the controller 40 will be explained using the flow chart in FIG. 5.

First, in step (abbreviated as "S" in the figure) 1, the output signal (20a, 20b in FIG. 7) from the MR sensor is captured. The output signal here refers to the output signal from the MR sensor, that is, either the MR sensor 22F or 22Z, in accordance with operation of manual focus ring 27 or manual zoom ring 28. The output signal is converted to pulses 20d and 20e shown in FIG. 7.

Then, in step 2, it is determined whether a signal corresponding to one pulse (alternatively, a plurality of pulses can be used) is output from the MR sensor within a predetermined time or not. When the signal corresponding to one pulse is output, that is, when it is determined that the manual focus ring 27 or manual zoom ring 28 is operated at a speed faster than the speed (predetermined speed) at which one pulse is output from the MR sensor within the above-described predetermined time, the process moves on to step 3. On the other hand, when the signal output from the MR sensor within the above-described predetermined time shows a signal variation less than one pulse (when there is not a signal output corresponding to one pulse in the predetermined time), that is, when it is determined that the manual focus ring 27 or manual zoom ring 28 has been operated at speed lower than the above-described predetermined speed, the process moves on to step 5.

In step 3, the number of pulses (digital signal) obtained by converting the output signal from the MR sensor, that is, the number of times the output signal from the MR sensor varies periodically, is counted. Then, in step 4, a driving operation of the focus drive stepping motor unit 12 (that is, fourth lens unit L4) or zoom drive stepping motor unit 13 (that is, second lens unit L2) is controlled based on the pulse count values.

More specifically, the controller 40 multiplies the pulse count value by a predetermined amount of motor drive or a predetermined amount of lens drive per one pulse and rotates and drives the stepping motor unit by the amount of rotation corresponding to the calculated target amount of driving. In this case, the controller 40 sends a drive signal to the driver circuit 42 or 43 (shown in FIG. 4), and the driver circuit that receives this drive signal drives the corresponding stepping motor unit based on the drive signal.

This causes the fourth lens unit L4 or second lens unit L2 to be driven at high speed corresponding to the high speed operation of the manual focus ring 27 or manual zoom ring 28. Then, the process moves on to step 7.

On the other hand, in step 5, the linear portion (portion 20h shown in FIG. 8) of the output signal (analog signal) from the MR sensor with good linearity is divided by a predetermined number (that is, intermediate division). Then, the process moves on to step 6, where the focus drive stepping motor unit 12 or zoom drive stepping motor unit 13 is driven and controlled based on the analog value of the MR sensor output at that point of time.

More specifically, the controller 40 multiplies the analog value obtained by a predetermined amount of motor drive or an amount of lens drive per unit analog value and rotates and drives the stepping motor unit by the amount of rotation corresponding to the calculated target amount of driving. In this case, the controller 40 sends a drive signal to the driver circuit 42 or 43 (shown in FIG. 4), and the driver circuit that receives the drive signal drives the corresponding stepping motor unit 12 based on the drive signal.

This causes the fourth lens unit L4 or second lens unit L2 to be driven at low speed corresponding to the low-speed operation of the manual focus ring 27 or manual zoom ring 28 with high position resolution. Then, the process moves on to step 7.

In step 7, it is further determined whether there is an output signal from the MR sensor or not, and if there is an MR sensor output, the process moves back to step 2; if there is no MR sensor output, the process moves on to step 8, and finishes the driving control operation over power variation or focus driving.

This embodiment has described the case where it is determined whether the manual focus ring 27 or manual zoom ring 28 has been operated faster or slower than a predetermined speed depending on whether a signal corresponding to one pulse (or a plurality of pulses) is output from the MR sensor within a predetermined time. However, it is also possible to use a different method to determine the operation speed of the manual focus ring 27 or manual zoom ring 28.

Figure 6:
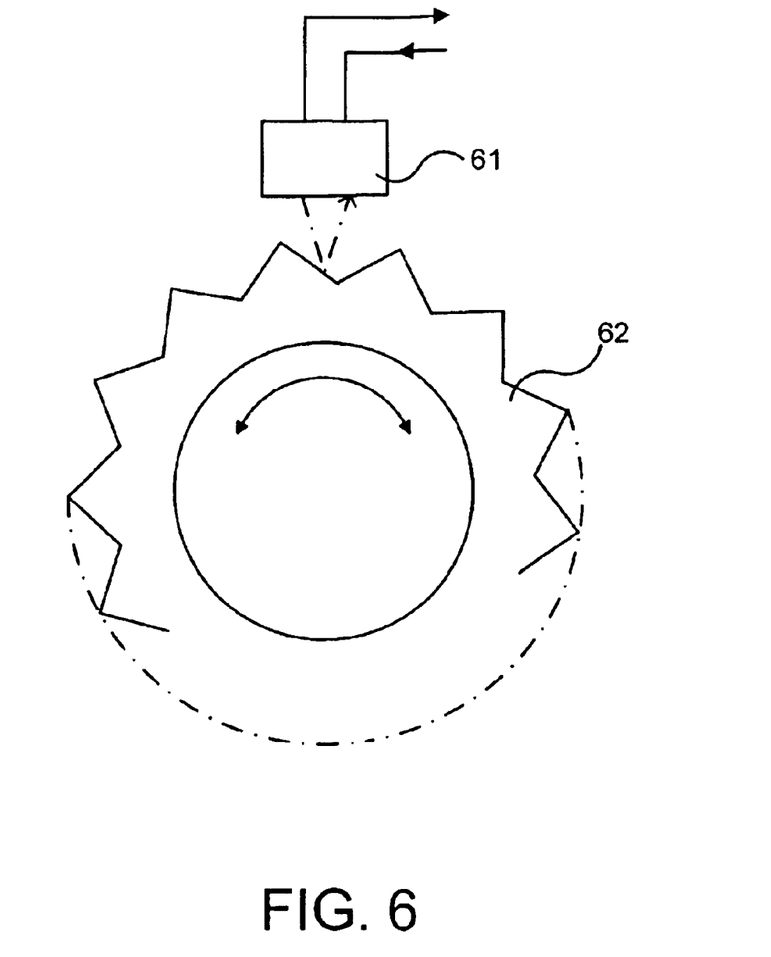
FIG. 6 is a schematic view of an optical sensor unit used in the lens apparatus in FIG. 1.

For example, FIG. 6 shows an optical sensor unit that can replace the MR sensor. Reference numeral 62 denotes a ring-shaped optical scale that rotates in accordance with operation of the manual focus ring or manual zoom ring, and a reflecting surface whose shape (orientation) varies periodically in the circumferential direction is formed on the outer circumference thereof. Reference numeral 61 denotes an optical encoder which has a light-emitting section and light-receiving section. The optical encoder 61 emits light from the light-emitting section onto the reflecting surface of the optical scale 62 and outputs an electric signal corresponding to the amount of light reflected on the reflecting surface and incident on the light-receiving section. When the optical scale 62 rotates and the position of light emitted from the optical encoder 61 on the reflecting surface changes, the amount of light received by the light receiving section of the optical encoder 61 varies periodically; therefore, by a shaping process of the electric signal output from the optical encoder 61, it is possible to obtain an output signal which varies periodically, or in a sine wave form, in the same way as the output signal from the MR sensor.

Thus, depending on whether a signal corresponding to one pulse (or a plurality of pulses) is output from the optical sensor unit within a predetermined time or not, it is possible to determine whether the manual focus ring or manual zoom ring has been operated faster or slower than a predetermined speed.

This embodiment has described the case where a target amount of drive of the stepping motor is obtained through calculations, but it is also possible to store a target amount of driving corresponding to a pulse count value or analog value in a memory as map data, and to read a target amount of driving from the memory.

Furthermore, this embodiment has described the case where the magnetic scale (or optical scale) rotates with respect to the fixed MR sensor (or optical encoder) through operations of the manual focus ring and manual zoom ring, but the present invention can also adopt a configuration in which the MR sensor (or optical encoder) moves with respect to the fixed magnetic scale (or optical scale) through operations of the manual focus ring and manual zoom ring. Furthermore, this embodiment has described the case where a ring-shaped scale (magnetic or optical scale) is used for a signal output unit, but it is also possible to use a scale having a shape other than a ring shape. For example, a flat-shaped or polygon-shaped scale can be used.

Furthermore, this embodiment has described the case of a lens apparatus having a variable-power optical system in a structure with four lens units of convex, concave, convex and convex lenses, but the present invention is also applicable to a lens apparatus having a different optical system configuration.

As explained above, according to this embodiment, when the operation member (manual focus ring or manual zoom ring) is operated faster than a predetermined speed, the drive unit is not controlled based on the value of a signal output from the signal output unit (magnetic sensor or optical encoder), but rather the drive unit is controlled based on the count of periodic variations of the signal, which makes it possible to drive the optical element at high speed and reduce the processing burden on the controller. On the other hand, when the operation member is operated slower than the predetermined speed, the drive unit is controlled based on the value of the signal output from the signal output unit, and therefore it is possible to improve the resolution of stop positions of the optical element.

While preferred embodiment has been described, it is to be understood that modification and variation of the present invention may be made without departing from scope of the following claims.

What is claimed is:

1. An optical apparatus comprising:

a movable optical element;

a drive unit that drives the optical element;

an operation member manually operated to instruct driving of the optical element;

a signal output unit that outputs a signal that varies periodically in accordance with operation of the operation member; and a controller that controls the drive unit based on the signal from the signal output unit, wherein the controller determines the operation speed of the operation member based on the signal from the signal output unit, and chooses whether to control the drive unit according to the operation speed based on a count of periodic variations of the signal from the signal output unit, or to control the drive unit based on the value of the signal from the signal output unit.

2. The optical apparatus according to claim 1, wherein when the operation speed of the operation member is faster than a predetermined speed, the controller controls the drive unit based on the count of periodic variations of the signal from the signal output unit, and when the operation speed is slower than the predetermined speed, the controller controls the drive unit based on a value of the signal from the signal output unit.

3. The optical apparatus according to claim 2, wherein when the operation speed of the operation member is slower than the predetermined speed, the controller controls the drive unit based on a value obtained through intermediate division of the signal from the signal output unit.

4. The optical apparatus according to claim 1, wherein the optical element performs power variation by moving in a direction of the optical axis of the optical apparatus.

5. The optical apparatus according to claim 1, wherein the optical element adjusts focusing by moving in a direction of the optical axis of the optical apparatus.

6. An image-pickup apparatus comprising:

the optical apparatus according to claim 1; and a photoelectric conversion element that photoelectrically converts an optical image formed by the optical apparatus.

* * * * *

UNITED STATES PATENT AND TRADEMARK OFFICE
CERTIFICATE OF CORRECTION

PATENT NO.     : 6,831,793 B2
DATED          : December 14, 2004
INVENTOR(S)    : Nakamura It is certified that error appears in the above-identified patent and that said Letters Patent is hereby corrected as shown below:

<u>Title page,</u>
Item [73], Inventor, "Tokyo" should read -- Tochigi --.

<u>Column 2,</u>
Line 1, "MR." should read -- MR --.

Signed and Sealed this

Twenty-eighth Day of June, 2005

JON W. DUDAS
*Director of the United States Patent and Trademark Office*